United States Patent
Beresnev

(10) Patent No.: US 9,632,254 B2
(45) Date of Patent: Apr. 25, 2017

(54) OPTICAL FIBER POSITIONER AND METHOD FOR MANUFACTURING SAME

(71) Applicant: U.S. Army Research Laboratory, Adelphi, MD (US)

(72) Inventor: Leonid A. Beresnev, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/819,621

(22) Filed: Aug. 6, 2015

(65) Prior Publication Data
US 2017/0038536 A1 Feb. 9, 2017

(51) Int. Cl.
*G02B 6/26* (2006.01)
*G02B 6/36* (2006.01)
*G02B 6/35* (2006.01)

(52) U.S. Cl.
CPC .......... *G02B 6/3616* (2013.01); *G02B 6/262* (2013.01); *G02B 6/3508* (2013.01); *G02B 6/3578* (2013.01)

(58) Field of Classification Search
CPC ... G02B 6/3616; G02B 6/3508; G02B 6/3578
See application file for complete search history.

(56) References Cited

U.S. PATENT DOCUMENTS

| | | | | |
|---|---|---|---|---|
| 5,727,098 A * | 3/1998 | Jacobson | ............. | G02B 26/103 385/22 |
| 6,005,998 A * | 12/1999 | Lee | .......................... | G02B 6/32 385/20 |
| 7,095,915 B2 * | 8/2006 | Dames | ..................... | G02B 6/32 385/16 |
| 8,503,837 B2 * | 8/2013 | Beresnev | ............. | G02B 6/4226 385/25 |
| 2001/0017956 A1 * | 8/2001 | Goodman | ............ | G02B 6/3502 385/16 |
| 2001/0055462 A1 * | 12/2001 | Seibel | ................ | A61B 1/00048 385/147 |
| 2002/0181844 A1 * | 12/2002 | Vaganov | .................. | G02B 1/06 385/17 |
| 2003/0063838 A1 * | 4/2003 | Hagood | ................ | G02B 6/022 385/16 |
| 2004/0042716 A1 * | 3/2004 | Dames | ..................... | G02B 6/32 385/31 |
| 2016/0216510 A1 * | 7/2016 | Tsuruta | ................ | G01N 21/474 |

* cited by examiner

*Primary Examiner* — Sung Pak
(74) *Attorney, Agent, or Firm* — Alan I. Kalb

(57) ABSTRACT

An optical fiber positioner having an elongated base with sidewalls and a longitudinally extending throughbore. A flexible optical fiber extends through the throughbore and has one end protruding outwardly from an end surface of the base. A plurality of actuators are secured to the sidewalls of the base so that an end of each actuator is positioned adjacent the end of the base. A crossbeam is then connected to the ends of each actuator so that the crossbeam moves laterally relative to the base in unison with the deflection of the actuators. The crossbeam has an opening through which the optical fiber extends so that the optical fiber deflects in unison with the lateral movement of the crossbeam. Various fixtures for assembly of the optical fiber positioner are also shown.

3 Claims, 4 Drawing Sheets

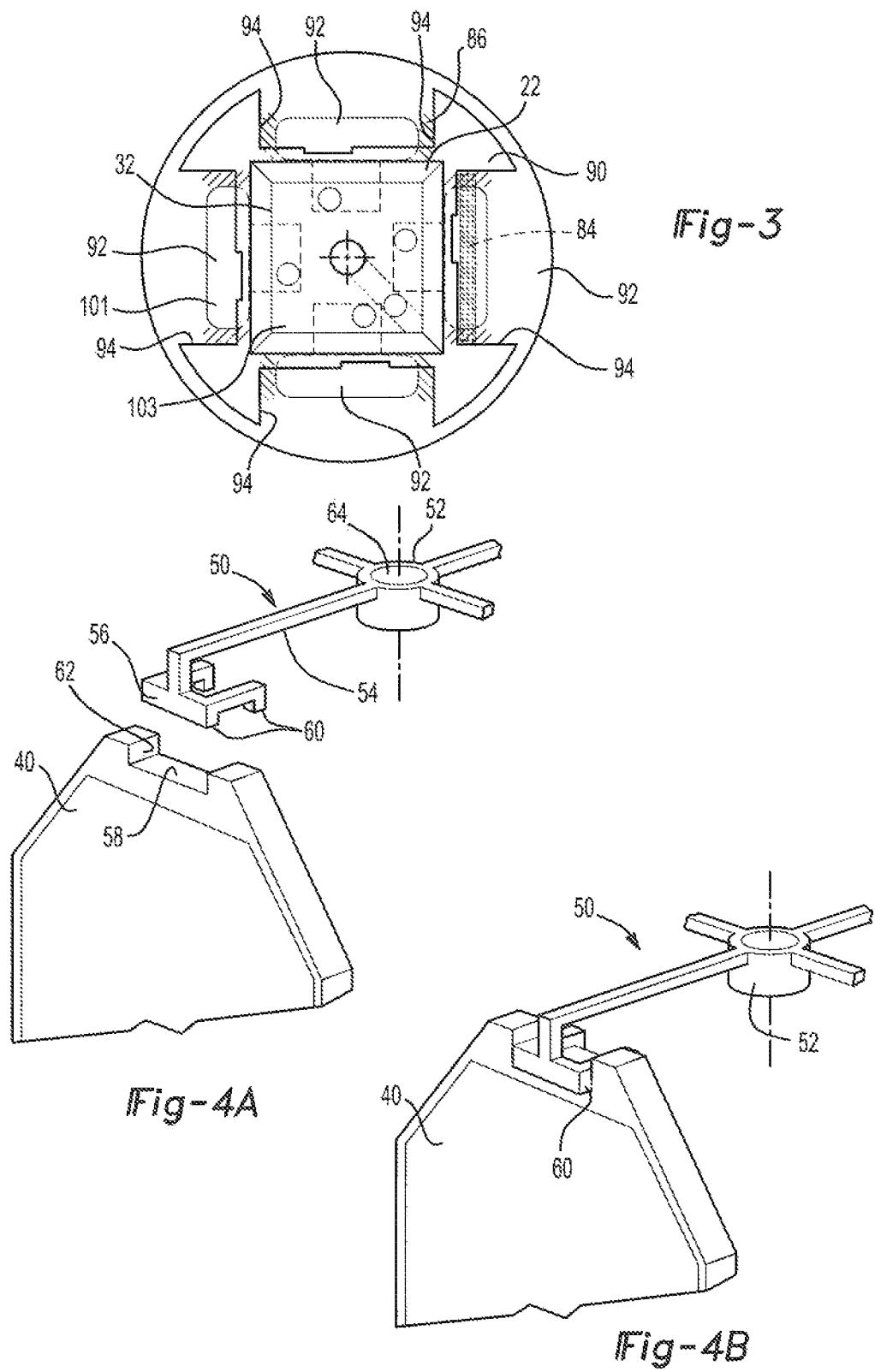

OPTICAL FIBER POSITIONER AND METHOD FOR MANUFACTURING SAME

GOVERNMENT INTEREST

The invention described herein may be manufactured, used, and licensed by or for the United States Government.

BACKGROUND OF THE INVENTION

I. Field of the Invention

The present invention relates generally to optical fiber positioners as well as a method for making the same.

II. Description of Related Art

There are many previously known optical fiber positioners. Such optical fiber positioners are used, for example, in optical scanners as well as other applications.

One such application for an optical fiber positioner is for use in free space laser transmissions which use the fiber optic for delivering the laser radiation into free space from the distal end of the delivery fiber. One requirement of an optical fiber positioner for use with laser transmissions in free space, however, is that the position of the optic fiber be precisely controlled.

For example, axial displacement of the optic fiber should be in the range of a fraction of a micron in order to obtain useful transmissions into free space. Furthermore, frequency bandwidth for the fiber tip displacement should be in the range of hundreds or even thousands of hertz for keeping the spot on the target or receiver effectively mitigating the wandering of beams for lower bandwidths.

Fiber optic collimators with fast displacement of the emitting tips can be combined into densely packed arrays. The direction of each beam can be controlled independently thus providing adaptive capability without additional expensive elements such as deformable mirrors and the like. However, the dense packing of such collimators into such arrays requires very high accuracy for the position of the optical fiber tips as well as high speed accuracy of movement of the fiber tips for reliable overlapping of all of the collimation beams onto the target.

Although there have been previously known optical fiber positioners for use with laser communications in free space, none of them have been able to obtain reliable large bandwidth communications.

SUMMARY OF THE PRESENT INVENTION

The present invention provides an optical fiber positioner which provides high accuracy and which overcomes the above mentioned disadvantages of the previously known devices.

In brief, the optical fiber positioner of the present invention includes an elongated base having four sidewalls that are circumferentially equidistantly spaced from each other, as well as a longitudinally extending throughbore. A flexible optical fiber extends through the throughbore and has one end protruding outwardly from an end of the base.

A piezoelectric actuator is secured to each of the base sidewalls. The actuators are generally planar in shape and two of the actuators are spaced apart and parallel from each other while, similarly, the other two actuators are also parallel and spaced apart from each other, but orthogonal relative to the first two actuators. One actuator is secured to each of the base sidewalls so that an end of each actuator is positioned adjacent the end of the base.

A crossbeam is then connected to the ends of the actuator so that the crossbeam moves laterally relative to the base in unison with the deflection of the actuators. This crossbeam has an opening through which the optical fiber extends and so that the optical fiber deflects in unison with the lateral movement of the crossbeam.

The present invention also discloses the use of two highly accurate fixtures which, when used during the construction of the optical fiber positioner, are capable of constructing the optical fiber positioner with high accuracy which is repeatable. As such, the optical fiber positioner when used in an array with other optical fiber positioners also constructed according to the present invention, laser communication in free space with large bandwidths is achieved.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 3 is a top plan view of the optical fiber positioner;

FIGS. 4A and 4B are fragmentary elevational views of the optical fiber positioner, with parts removed for clarity;

DETAILED DESCRIPTION OF A PREFERRED EMBODIMENT OF THE PRESENT INVENTION

Figure 1:
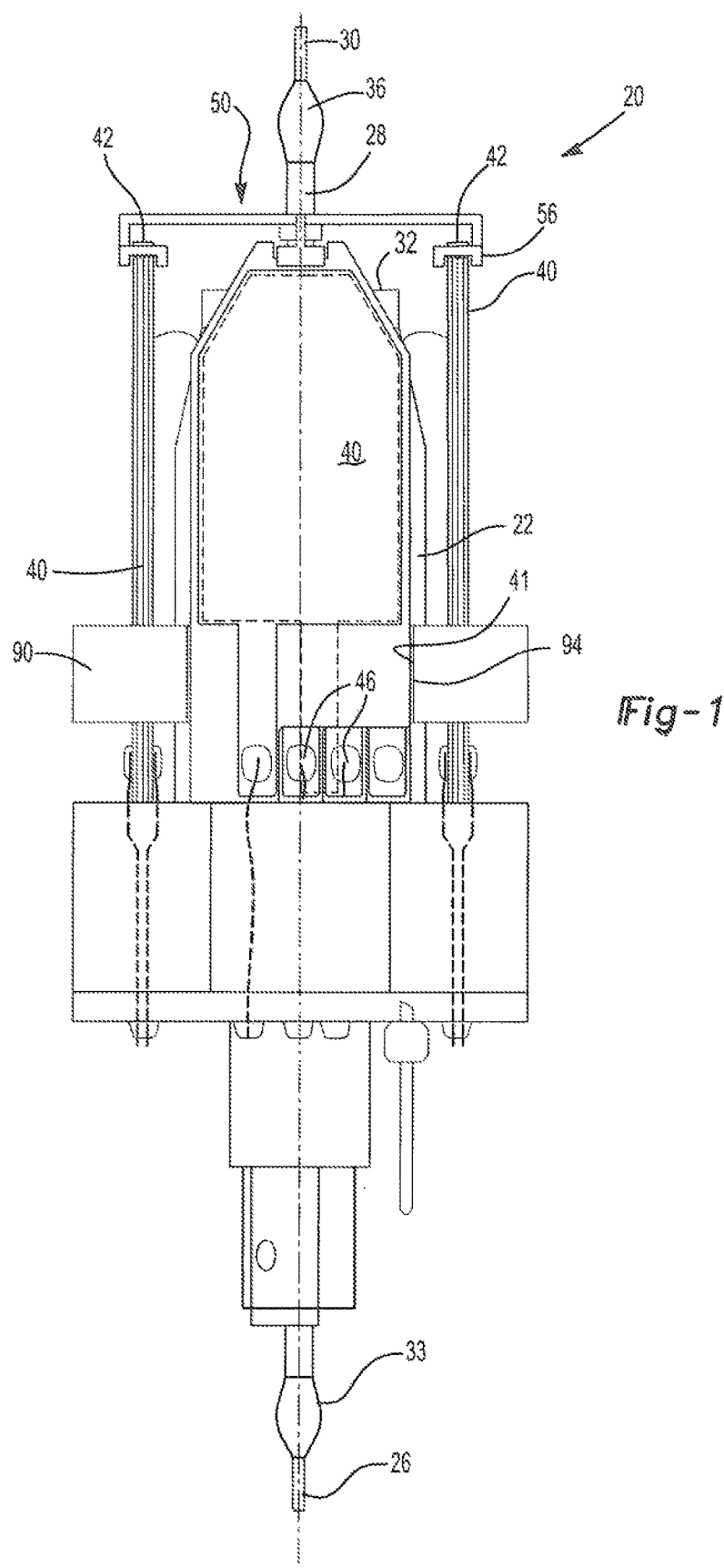
FIG. 1 is a longitudinal side view of the optical fiber positioner.
Figure 2:
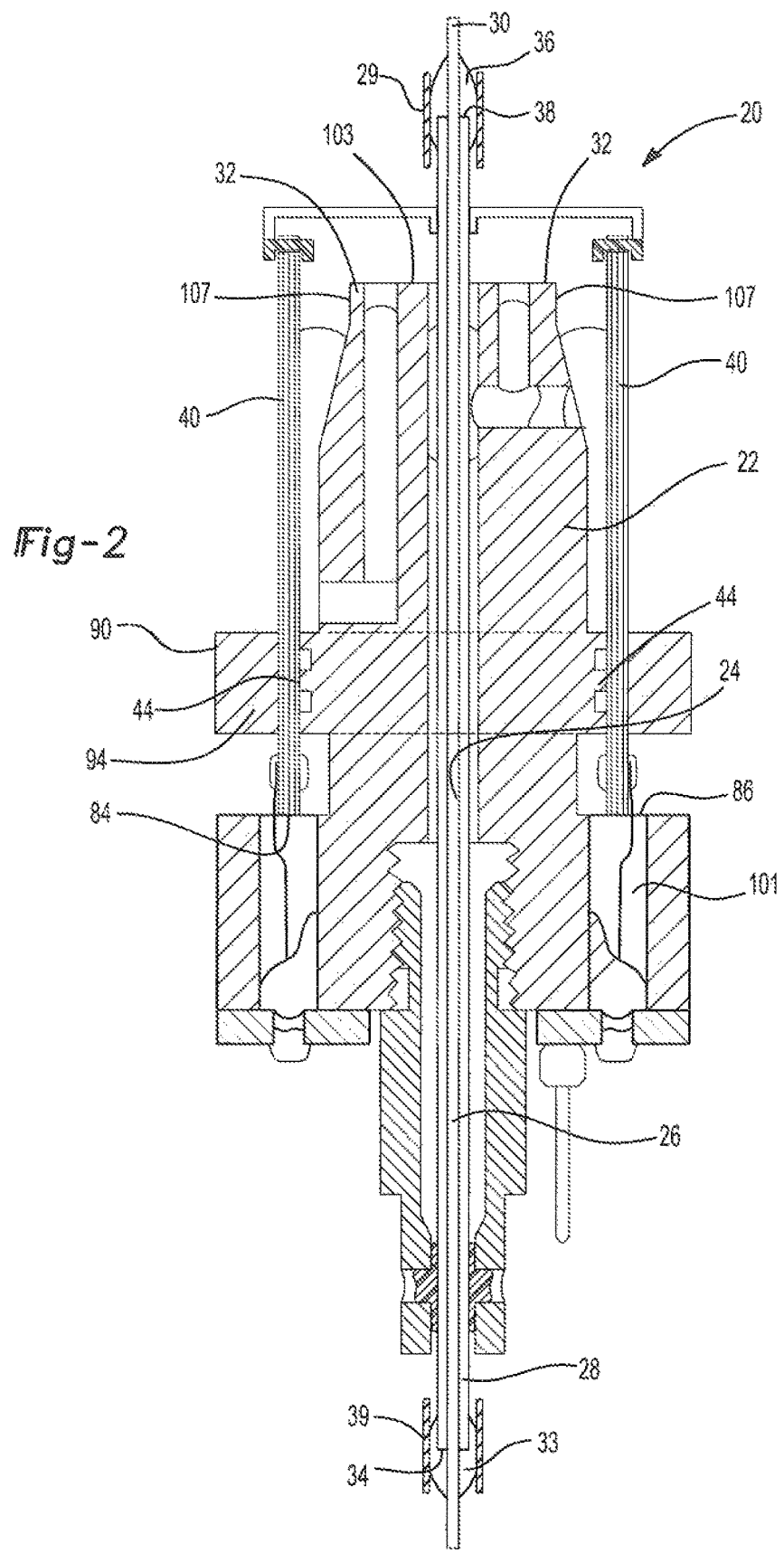
FIG. 2 is a longitudinal sectional view of the optical fiber positioner.

With reference first to FIGS. 1-2, an optical fiber positioner 20 according to the present invention is shown. The optical fiber positioner 20 includes an elongated base 22 which is generally square in cross-sectional shape (see FIG. 3). A longitudinally extending throughbore 24 is formed through the base 22. This throughbore 24 is dimensioned to receive an optical fiber 26 surrounded by a protective sheath 28. Furthermore, one end 30 of the optic fiber 26 protrudes outwardly from an upper end 32 of the base 22.

As best shown in FIG. 2, a drop of adhesive 33 is applied between a lower end 34 of the protective sheath 28 and the optic fiber 26 and a reinforcing tube 39 is positioned around the sheath 28 and adhesive 33. Similarly, a second drop 36 of adhesive is applied between the other or upper end 38 of the protective sheath 28 and the optic fiber 26. These drops of adhesive 33 and 36 serve both to maintain the accuracy of the optical fiber 26 relative to its protective sheath 28, and also add stability to the overall construction of the optical fiber and its protective sheath 28. A reinforcing tube 29 is also positioned around the end of the sheath 28 and the adhesive 33.

Referring again to FIGS. 1 and 2, a generally planar actuator 40 is associated with each of the four sides of the base 22. Consequently, two of the actuators 40 are spaced apart and parallel to each other on opposite sides of the base 22 while, similarly, the other two actuators 40 are also spaced apart and parallel to each other, but lie in a plane orthogonal to the plane of the first two actuators 40. Furthermore, one end 42 of each actuator 40 is positioned adjacent the upper end 32 of the base 22.

The actuators 40 are constructed from two or more layers of a piezoelectric material. Furthermore, as best shown in FIG. 2, the actuators 40 are each secured to a mounting surface 44 on the base 22 by an adhesive. Thus, when an electric voltage is applied to contact pads 46 on the actuator 40, the actuator 40 will flex about its contact surface 44 with the base 22 by an amount and a direction corresponding to the polarity and magnitude of the applied voltage.

With reference now to FIGS. 1, 4A, and 4B, a cross shaped crossbeam 50 includes a center hub 52 and four outwardly extending arms 54 so that one arm 54 extends outwardly toward each of the four actuators 40. A saddle 56 is formed on the free end of each arm 54. This saddle 56 is dimensioned to fit within a notch 58 formed at the upper end of the actuator 40 as shown in FIG. 4B. Furthermore, with the saddle 56 nested in the notch 58, protrusions 60 on the saddle 56 prevent movement of the saddle 56 in a radial direction relative to the hub 52. Simultaneously, the coaction between the saddle 56 and the sidewalls 62 of the notch 58 prevents movement of the saddle 56 relative to the actuator 40 in a tangential direction relative to the hub 52. The saddles 56 and their respective actuators 40 are preferably glued together.

With reference still to FIGS. 1 and 4, the hub 52 includes an opening 64 which extends longitudinally relative to the base 22. This opening 64 is dimensioned to receive the optical fiber 30 and the sheath 28 therethrough. Furthermore, the opening 64 in the hub 52 is dimensioned to be substantially the same as the outside dimension of the protective sheath 28 so that the hub 52, and thus the optic fiber 30, move in unison with any lateral movement of the crossbeam 50.

In operation, an electric voltage is applied to the electrical connection pads 46 on the actuators 40. The actuators 40 will then deflect by an amount and in a direction equal to the magnitude of the voltage and polarity of the voltage relative to the base 22. In doing so, the actuators 40 laterally displace the crossbeam 50 and thus laterally displace the tip 30 of the optical fiber 26. The displacement of the tip of the optical fiber, furthermore, may occur at a high frequency.

In order to obtain the high accuracy of the position of the tip 30 of the optical fiber 26 for certain applications, such as laser communication in free space, it is necessary that the actuators 40 be precisely positioned relative to the base 22 and, likewise, that the crossbeam 50 be accurately positioned relative to the actuators 40.

Figure 5:
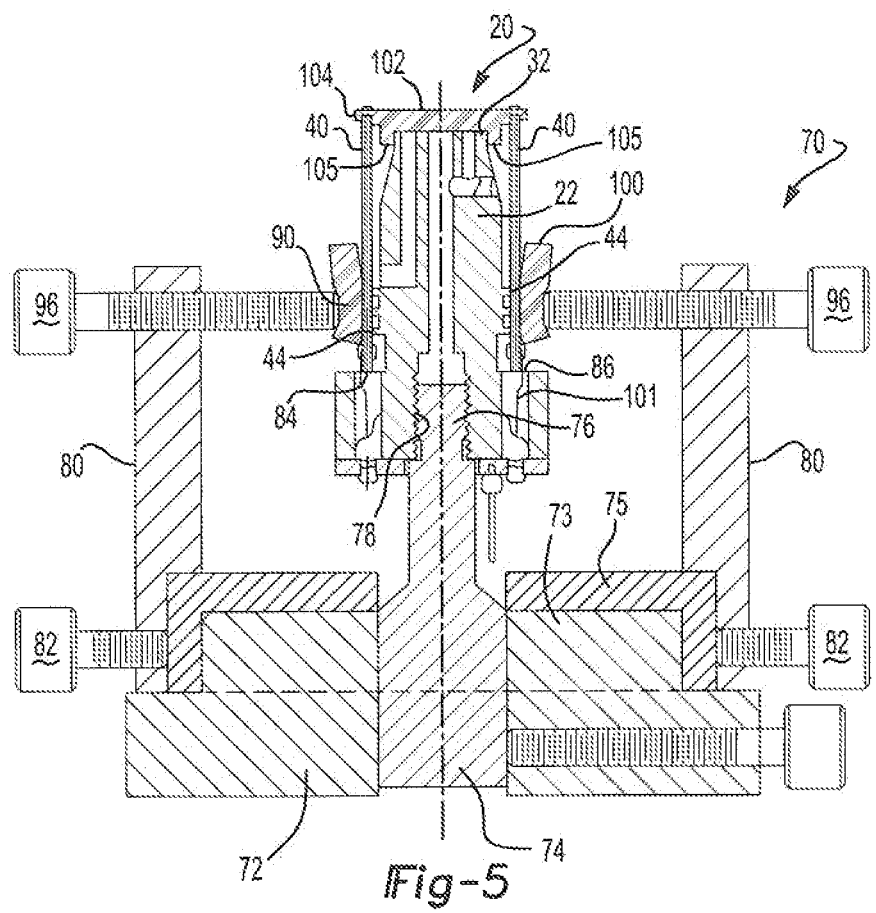
FIG. 5 is a longitudinal sectional view of the optical fiber positioner during assembly.

With reference then to FIG. 5, a fixture 70 is shown for accurately constructing the optical positioner with a high degree of precision. The fixture 70 includes a fixture base 72 with cylinder area 73 and a holder 74 secured to the base 72. This holder 74 includes an upper threaded portion 76 which threadably engages a threaded bore 78 in the base 22 so that the position of the base 22 is precisely positioned relative to the fixture base 72. Four pillars 80 are secured to the cylinder mount 75 capable to rotate around cylinder area 73 so that one pillar 80 is aligned and associated with each of the four actuators 40.

In order to precisely position the actuators 40 onto the base 22, a machine locating surface 84 is formed on at least a portion of the bottom of each actuator 40. These locator surfaces 84 in turn abut against a precision locator surface 86 formed on the base 22. Consequently, with each of the four actuators 40 positioned onto the base 22 so that their locator surfaces 84 are flatly abutting against their associated locating surfaces 86 on the base 22, the vertical position of each actuator 40 relative to the base 22 is precisely fixed.

With reference now to FIGS. 1, 2, 3 and 5, in order to ensure that the actuators 40 are precisely positioned circumferentially around the base 22, a spacing fixture 90 is snugly positioned around the base 22 so that the spacing fixture 90 is spaced upwardly from the locator surface 86 formed on the base 22. This locating fixture 90 includes four generally rectangular pockets 92 each of which is designed to receive one actuator 40. Furthermore, these pockets 92 each include a said mount surface 44 and locator surfaces 94 on their sides which are precisely spaced apart from each other. These locator surfaces 94, furthermore, flatly abut against like locator surfaces 41 on the sides of the actuators 40 in order to precisely circumferentially position the actuators 40 around the base 22. Furthermore, a square central bulk 96 on top of base 20 (FIGS. 2, 3, 5, 6) is dimensioned to precisely fit around the base 22 so that the position of the bulk 96 is fixed relative to the fixture 90.

With reference now to FIGS. 3 and 5, with the actuators 40 flatly positioned against the locator surfaces 44, 86 and 94 on the base 22 and fixture 90, respectively, a screw 96 (FIG. 5) threadably engages each pillar 80 and is aligned with the mounting surface 44 on the base 22. With glue applied to the mounting surface 44 and the spacing fixture 90 positioned around the base 22, the screws 96 are compressed against the actuators 40, preferably through a piece of elastomeric material 100, to thereby hold the actuators 40 against their mounting surface 44 on the base 22 until the adhesive has set. Any excess adhesive is collected within chambers 101 around the base 22.

Figure 6:
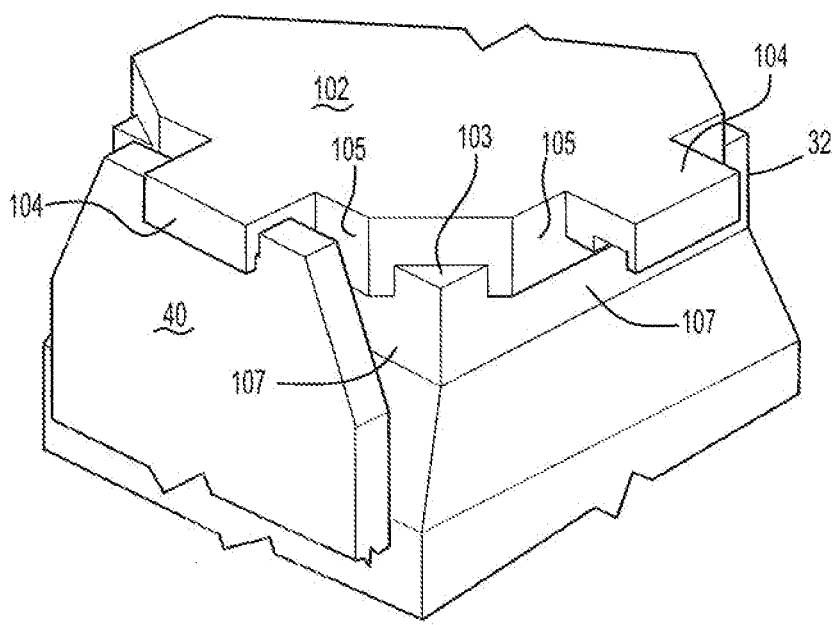
FIG. 6 is a fragmentary elevational view of the optical fiber positioner with parts removed for clarity during assembly.

With reference now to FIG. 6, a cross imitator 102 is shown having four simulated saddles 104, i.e. one saddle for each of the channels 62 in the actuators 40. These saddles 104, furthermore, are precisely machined to closely simulate the size of the saddles 56 on the crossbeam 50. As such, with the saddles 104 of the cross imitators 102 positioned within their receiving channels in the actuators 40, the tops of the actuators 40 are precisely positioned.

In addition the cross imitator 102 flatly abuts against a flat locator surface 103 on the top 32 of base 22 to vertically position the cross imitator 102, FIGS. 2, 3, 6. Four flanges 105 (only two shown in FIGS. 5 and 6) on the cross imitator 102 also abut against four location surfaces 107 (only two shown in FIGS. 2 and 6) on the top 32 of base 22 to precisely position the cross imitator 102.

The cross imitator 102 is left in position as shown in FIG. 6 until the glue attaching the actuators 40 to the base 22 has set. Thereafter, the cross imitator 102 is removed and replaced by the crossbeam 50 (FIG. 4). The saddles 56 for the crossbeam 50 are each adhesively secured to their receiving channels 58, 62 in the actuators 40. Once the crossbeam 50 has been attached to the actuators 40, the construction of the fiber positioner is completed and the fiber positioner 20 is removed from the holding fixture 70.

From the foregoing, it can be seen that the present invention provides both an improved fiber optic positioner with a wide frequency bandwidth as well as a method of fabrication of the positioner. Having described my invention, however, many modifications thereto will become apparent to those skilled in the art to which it pertains without deviation from the spirit of the invention as defined by the scope of the appended claims.

I claim:

1. A method of assembling an optical fiber positioner comprising the steps of:

providing an elongated base having a longitudinally extending throughbore through which an optical fiber extends, said base having a plurality of circumferentially spaced locating surfaces which lie in a plane transverse to an axis of said housing, securing a fixture to said base, said fixture having a plurality of longitudinally extending and circumferentially spaced facing pairs of locating surfaces (holding the threaded fasteners) so that a pair of locating surfaces on said fixture is associated with each locating surface on said base, securing a plurality of circumferentially spaced actuators to said base so that each actuator is in abutment with one pair of locating surfaces on the fixture and their associated locating surface on the base, each actuator having one end adjacent one end of said base, attaching a crossbeam to second ends of said actuators, said crossbeam having an opening through which said optical fiber extends, said opening being dimensioned such that said optical fiber moves in unison with said crossbeam, and comprising the step of attaching a cross imitator to said ends of said actuators during said securing step, said cross imitator positioning said second ends of said actuators in preparation for said step of attaching said crossbeam.

2. A method of assembling an optical fiber positioner comprising the steps of:

providing an elongated base having a longitudinally extending throughbore through which an optical fiber extends, said base having a plurality of circumferentially spaced locating surfaces which lie in a plane transverse to an axis of said housing, securing a fixture to said base, said fixture having a plurality of longitudinally extending and circumferentially spaced facing pairs of locating surfaces (holding the threaded fasteners) so that a pair of locating surfaces on said fixture is associated with each locating surface on said base, securing a plurality of circumferentially spaced actuators to said base so that each actuator is in abutment with one pair of locating surfaces on the fixture and their associated locating surface on the base, each actuator having one end adjacent one end of said base, attaching a crossbeam to second ends of said actuators, said crossbeam having an opening through which said optical fiber extends, said opening being dimensioned such that said optical fiber moves in unison with said crossbeam, comprising the step of attaching a cross imitator to said ends of said actuators during said securing step, said cross imitator positioning said second ends of said actuators in preparation for said step of attaching said crossbeam wherein said securing step comprises the step of adhesively securing said actuators to said base and wherein said cross imitator is removed after the adhesive has set and before said crossbeam is attached to said actuators.

3. The method as defined in claim 2 and comprising the step of compressing said actuators between said fixture and said base during said securing step.

\* \* \* \* \*